Feb. 16, 1965 H. C. FLINT 3,169,795
HINGED BACK CUSHION MOVABLE WITH THE SEAT CUSHION
Filed March 26, 1962 2 Sheets-Sheet 1
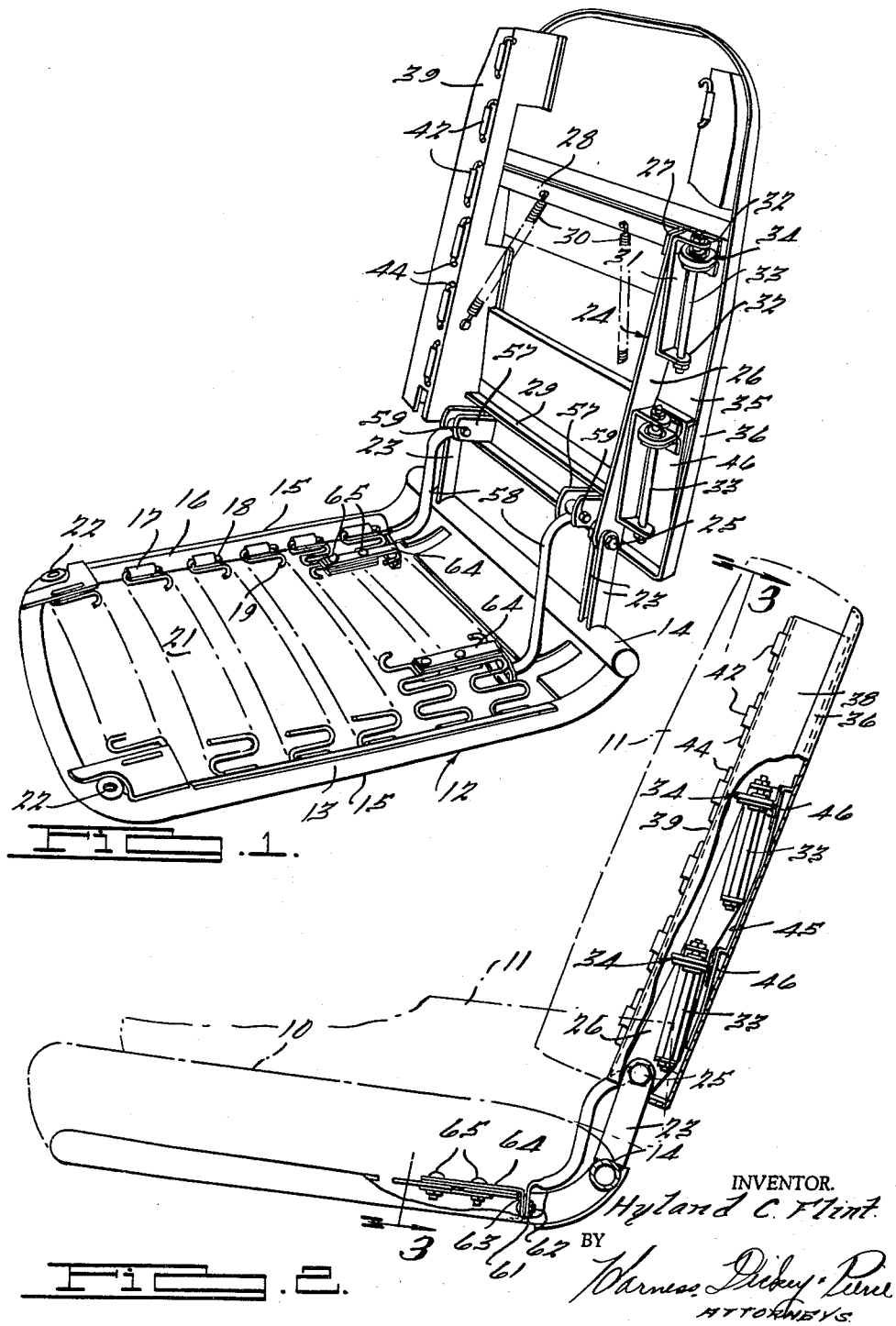
INVENTOR.
Hyland C. Flint
BY
Harness, Dickey & Pierce
ATTORNEYS Feb. 16, 1965 H. C. FLINT 3,169,795
HINGED BACK CUSHION MOVABLE WITH THE SEAT CUSHION
Filed March 26, 1962 2 Sheets-Sheet 2
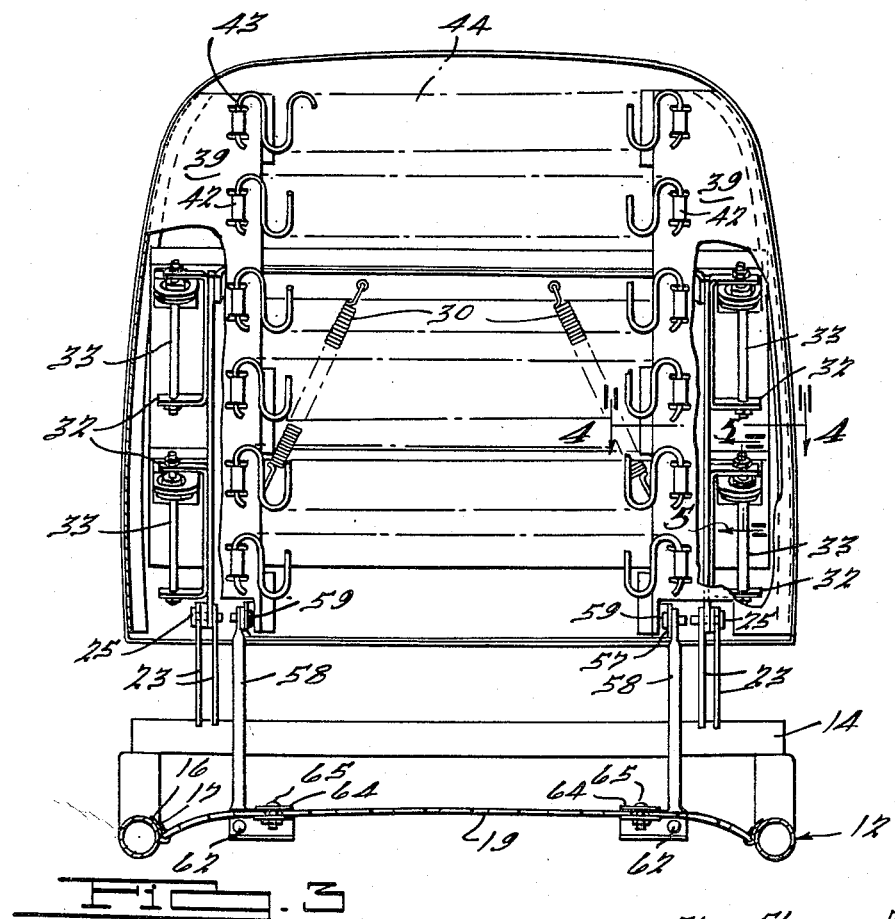
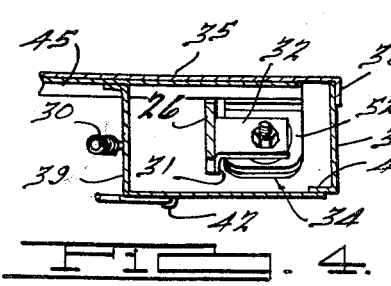
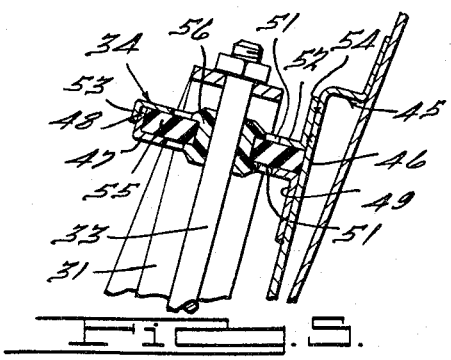
INVENTOR.
Hyland C. Flint.
BY
Harness, Dickey & Pierce
ATTORNEYS

United States Patent Office 3,169,795
Patented Feb. 16, 1965

3,169,795
HINGED BACK CUSHION MOVABLE WITH THE SEAT CUSHION
Hyland C. Flint, 3551 Walnut Lake Road, Rte. 2, Orchard Lake, Mich.
Filed Mar. 26, 1962, Ser. No. 182,298
4 Claims. (Cl. 297—309)

This invention relates to seats having interconnected seat and back cushions, and particularly to a seat having a back cushion which moves vertically with the sprung portion of the seat cushion and which is foldable thereover, and is a continuation-in-part of the application of H. C. Flint, Serial No. 775,414, filed November 21, 1958, now Patent No. 3,034,829, issued May 15, 1962.

While seats have been constructed heretofore having a back cushion which moved vertically with the sprung portion of the seat cushion, the present invention pertains to such a seat, so constructed as to permit the back cushion to fold forwardly over the seat cushion. The foldable action of the back cushion is desirable when the seat is employed in an automotive vehicle to increase the ease of movement of the occupant to and from the rear compartment thereof. The frame of the seat cushion has an upwardly extending support to which is pivoted a back cushion support on which rods are mounted having universally movable sliding elements to which the back panel of the back cushion is secured. Springs interconnect the back cushion support and the back panel to provide an upward bias to the former.

Accordingly, the main objects of the invention are: to provide a seat and back cushion so connected as to permit the back cushion to move vertically with the sprung portion of the seat cushion and to be tilted forwardly thereover; to provide a seat and back cushion with a unison action and a thin construction for the back cushion by employing a plurality of rods and universal elements for supporting the frame of the back cushion; to support the back cushion on universal longitudinally movable supporting elements, a pair of which is mounted on each side of the back cushion and enclosed by a box-section structure which forms a support for spring strips which extend therebetween to provide resiliency to the central portion of the back cushion, and, in general, to provide a unison seat structure in which the back cushion moves vertically with the sprung portion of the seat cushion while being tiltable thereover, all of which is simple in construction, positive in operation and economical to manufacture.

Other objects and features of novelty of the invention will be specifically pointed out or will become apparent when referring, for a better understanding of the invention, to the following description taken in conjunction with the accompanying drawings, wherein:

FIGURE 1 is a perspective view of a seat and back cushion frame interconnected and constructed in a manner conforming to the present invention with parts omitted and broken away;

FIG. 2 is a broken, side elevational view of the structure illustrated in FIG. 1;

FIG. 3 is a sectional view of the structure illustrated in FIG. 2, taken on the line 3—3 thereof;

FIG. 4 is an enlarged sectional view of the structure illustrated in FIG. 3, taken on the line 4—4 thereof;

FIG. 5 is an enlarged sectional view of the structure illustrated in FIG. 3, taken on the line 5—5 thereof.

Referring to FIGS. 1 to 5, the seat of the present invention embodies a seat cushion 10 and a back cushion 11 outlined in FIG. 2 with broken lines. A frame structure of the seat and back cushions is herein described in detail as the padding and trim material to be applied thereto are of conventional form and are not herein referred to in detail. The seat cushion has a seat frame 12 comprising a U-shaped tubular section 13, the rear open end of which is interconnected by a tubular section 14. The side rail portions 15 have a metal strip 16 welded thereto containing reversely bent tabs 17 in which the end portion 18 of sinuous spring strips 19 is secured to provide the sprung seating area 21 for the seat cushion. Threaded bosses 22 are secured to the front corners of the frame by which the frame is secured to a pair of supporting seat tracks (not shown) mounted on the floor of the vehicle. The rear tubular section 14 has two pairs of spaced upwardly extending arms 23 which function as supports for a back supporting frame 24 which is secured thereon by pivots 25.

The back supporting frame has vertically extending side members 26 interconnected at the top by the end flanges 27 of a crossbar 28. The side members 26 have channel-shaped brackets 31 secured thereto, the extending flanges 32 of which support rods 33 upon which universally tiltable sliding elements 34 are mounted. The brackets and rods are in aligned relation on each of the members 26 when viewed from the front but are in parallel offset relation when viewed from the side, as illustrated in FIG. 2. It can well be seen that if a rod 33 were extended to have a length equal to that occupied by both of the rods, the thickness of the back frame would be substantially doubled. By dividing the rods and offsetting them as illustrated in FIG. 2, a desirable thin back is obtained. Especially is this true when the axis of the rods is disposed at an angle substantially half way between the plane in the angle of tilt of the back seat cushion and the vertical plane.

A back cushion supporting panel 35 has the universal elements 34 secured thereto for movement therewith upwardly and downwardly on the four rods 33. The panel 35 has a flange 36 provided about its peripheral edge. An upstanding sheet 38 is secured to the flange 36 at both sides of the panel to a flange 41 of which angle-shaped closure elements 39 are secured, having a flange 40 attached to the body portion of the panel 35. This completely encloses the elements 26 of the back cushion supporting frame, as well as the brackets 31, rods 33 and universal elements 34 at both sides of the back panel 35. The elements 39 have struckout portions 42 along the inner edges which function as tunnels for receiving the ends 43 of sinuously shaped spring strips 44 which span the two elements 39 and form a central resilient support for the back cushion. It will be noted that a plate 45 is mounted on the back panel 35 having two angle-shaped portions 46 which are disposed parallel to the rods 33 and to which the universal elements 34 are secured. The elements 39 and the crossbar 28 have apertures therethrough into which the eyes at the ends of the springs 30 are secured. The springs retract the seat cushion to its uppermost position when the seat is unoccupied and assist in supporting the load thereon.

The universal elements 34, as illustrated in FIG. 5, are made from a bottom stamping 47 containing a central aperture 51. Three sides of the stamping 47 have an upstanding flange 48, the fourth side having a downwardly extending flange 49. The upper stamping 52 is similarly constructed, having a central aperture 51 and an outer flange 53 on three sides which extend over the flange 48 and a flange 54 disposed in the opposite direction in aligned relation to the flange 49. A sheet of rubber 55 is provided between the two stampings 47 and 52, the center of which supports the sliding element 56 of low friction material. The low friction material could be nylon, Dacron or other resin or tin, brass, bronze, sintered or other metal. The flanges 49 and 54 are welded to the surface of the sloping portions 46 of the plate 45 to rigidly secure the universal element 34 thereto. No binding can occur between the low friction element 56 and the rods 33 since the elements are free to tilt in any direction and slide on the rods even when the latter are out of parallelism. The four rods and universal elements maintain the back cushion rigidly mounted upon the supporting frame 24 while permitting it to move upwardly and downwardly without any substantial resistance.

U-shaped brackets 57 are mounted on an angle member 29 at the bottom of the back cushion panel 35 to which the upper ends of a pair of S-shaped arms 58 are secured by pivots 59. The lower ends 61 of the S-shaped arms are flattened and secured by a rivet 62 to a downwardly extending flange 63 of a pair of plates 64 which are secured by bolts, rivets or the like 65 to two or more of the rearwardly disposed sinuous spring strips 19 of the seat cushion 10. With this arrangement, the S-shaped arms 58 are free to pivot on the pivots 59 relative to the seat forwardly and rearwardly, while the lower ends 61 are free to pivot laterally of the seat frame on the brackets 64 and thereby substantially reduce any tendency to bind at the ends.

When the seat cushion is unoccupied, the pivots 59 are substantially aligned with the pivots 25 and the back cushion may be tilted forwardly over the seat cushion to a position substantially parallel thereto lying directly thereupon. Any misalignment between the pivots 25 and 59 is absorbed by the deflection of the spring strips 19 to which the brackets 64 are secured, aided by the pivoting of the lower ends 61 of the arms laterally of the seat about the rivets 62. When the back cushion is in raised position due to the tension of the springs 30, the occupant of the seat will cause the rearmost spring strips 19 to be deflected downwardly, causing the back cushion to be moved downwardly therewith due to the connection of the S-shaped arms 58 thereto. Any upward and downward movement of the occupant due to the movement of the vehicle will cause the back cushion to move upwardly and downwardly therewith as the rear spring strips 19 of the seat cushion are moved upwardly and downwardly due to the upward and downward movement of the occupant. In this manner, a unison action is provided between the back cushion and the surface of the seat cushion which enhances the driving comfort without detracting from the ease of entering and leaving the rear compartment of the vehicle since the back cushion readily hinges forwardly upon the seat cushion.

What is claimed is:

1. A seat frame having a sprung area, a back cushion, means for supporting said back cushion for up and down and forwardly tilting movements, arms pivoted to said back cushion and connected to the sprung area of said seat frame, and spring means interconnecting the back cushion and its supporting means for resisting downward movement of said back cushion.

2. In a seat construction, a seat frame having a sprung area, back cushion supporting means, pivots securing said supporting means to said seat frame, a back cushion universally supported for vertical movement on said supporting means, arms secured to said back cushion on pivots aligned with the pivots securing the back cushion supporting means to the seat frame, means connecting the opposite ends to the arms to the sprung area of the seat frame, and spring means interconnecting the back cushion and its supporting means for resisting downward movement of said back cushion.

3. In a seat construction, a seat frame having a sprung seating area, a back cushion, a back cushion supporting frame pivotally secured to said seat cushion frame, slide means securing the back cushion on said supporting frame, arms interconnecting the back cushion with the sprung area of the seat cushion, and spring means secured between said back cushion and said supporting frame for urging said back cushion upwardly.

4. In a seat construction, a seat cushion frame having a sprung seating area, a back cushion, a back cushion supporting frame secured to said seat cushion frame, slide means securing the back cushion to the supporting frame embodying rods and universally movable bushing means slidable thereon, arms interconnecting the back cushion to the sprung area of the seat cushion, and spring means secured between said back cushion and the supporting frame therefor for urging said back cushion upwardly.

References Cited in the file of this patent

UNITED STATES PATENTS

| | | |
|---|---|---|
| 1,756,825 | Hess | Apr. 29, 1930 |
| 2,009,024 | Salmons | July 23, 1935 |
| 2,100,476 | Flint | Nov. 30, 1937 |
| 2,300,422 | Hickman | Nov. 3, 1942 |
| 2,982,343 | Flint | May 2, 1961 |
| 3,034,829 | Flint | May 15, 1962 |

UNITED STATES PATENT OFFICE
CERTIFICATE OF CORRECTION

Patent No. 3,169,795                        February 16, 1965

Hyland C. Flint

It is hereby certified that error appears in the above numbered patent requiring correction and that the said Letters Patent should read as corrected below.

Column 4, line 16, for "to", first occurrence, read -- of --.

Signed and sealed this 3rd day of August 1965.

(SEAL)
Attest:

ERNEST W. SWIDER                        EDWARD J. BRENNER
Attesting Officer                          Commissioner of Patents